Figure 1:
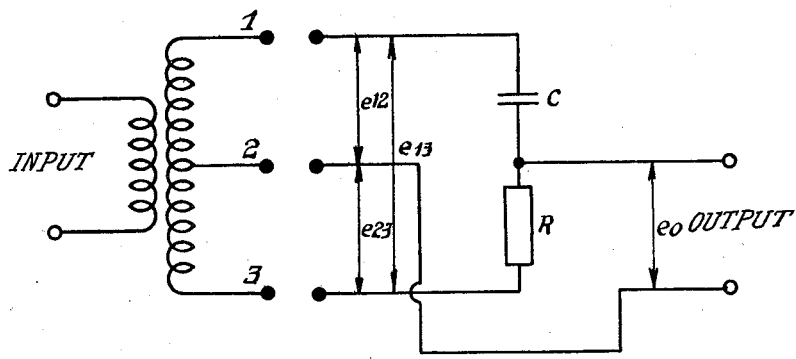

April 11, 1961   L. M. J. C. RICHARD   2,979,657
APPARATUS FOR THE CONTINUOUS RECORDING
OF INDUSTRIAL HARMONICS
Filed Aug. 6, 1956   4 Sheets-Sheet 1

United States Patent Office 2,979,657
Patented Apr. 11, 1961

2,979,657
APPARATUS FOR THE CONTINUOUS RECORDING OF INDUSTRIAL HARMONICS

Louis Marie Jules Clement Richard, 32 Rue Capitaine Crespel, Brussels, Belgium

Filed Aug. 6, 1956, Ser. No. 602,135

Claims priority, application Belgium Aug. 10, 1955

4 Claims. (Cl. 324—77)

The present invention relates to an apparatus for the recording of industrial harmonics particularly designed and constructed for the continuous recording as desired of the principal harmonics of the frequency of high and low voltage networks regardless of fluctuations of the frequency of the networks.

The apparatus forming the object of the invention is based on the use of an apparatus used in the radio-communication art known as "Selectoject" and designed in this art as an adjustable selective amplifier intended to be inserted in a radio-communication receiver between the detector circuit and the low frequency chain of the receiver.

This apparatus, which has been described by O. G. Villard, Jr. and Donald K. Weaver, Jr. in the American Journal Q.S.T. of November, 1949, page 11, does not envisage the continuous recording of network harmonics and does not measure industrial voltages and currents. It is not a measuring instrument and does not function upon the fundamental frequency of industrial networks nor on its harmonics; its pass band and its selectivity are not suitable for the application at present envisaged and it does not comprise circuits nor suitable means for operating a measuring instrument of the recording type.

The recording apparatus for harmonics of networks according to the invention borrows from the "Selectoject" the principle of resistance-capacity phase-shift connected between the anode and cathode of a triode and the positive feedback by a feedback amplifier, but in the case of the invention the numerical values are notably different.

The apparatus essentially comprises two selective amplifiers of the "Selectoject" type mounted in series, preceded by attenuators for bringing the input voltages to a suitable level and followed by a low frequency amplifier having a strictly linear response curve in the scale of frequencies envisaged, namely 50 to 500 cycles, operating a recorder.

To facilitate the description, each selective amplifier is called hereinafter a "selector stage." A "selector stage" is hence that which radio electricians call a "Selectoject."

Each selector stage is equipped with two double tubes; it hence comprises in fact four stages, namely two phase-shift stages, a feedback stage and an output stage.

The essential part of the selector stage is constituted by the phase-shift stages.

Figure 2:
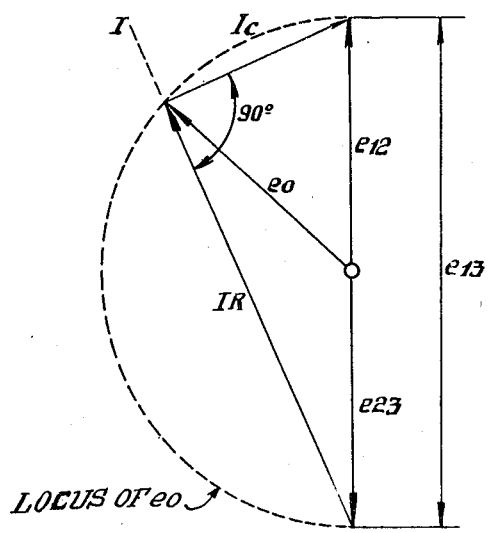
Figure 3:
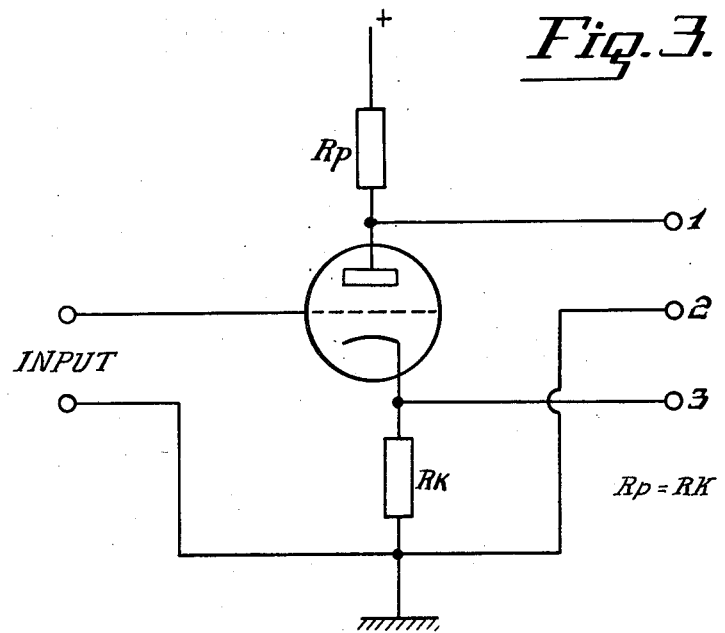
Figure 4:
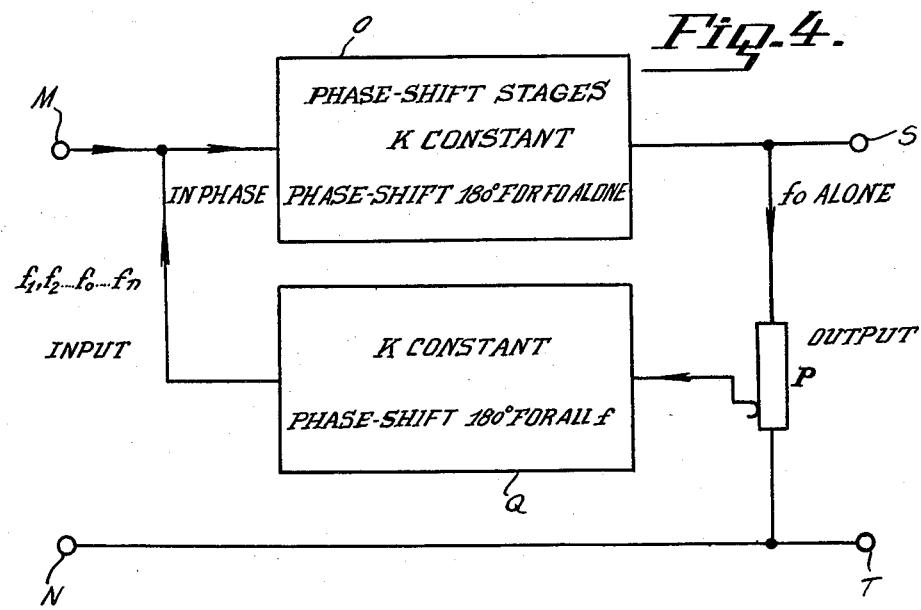
Figure 5:
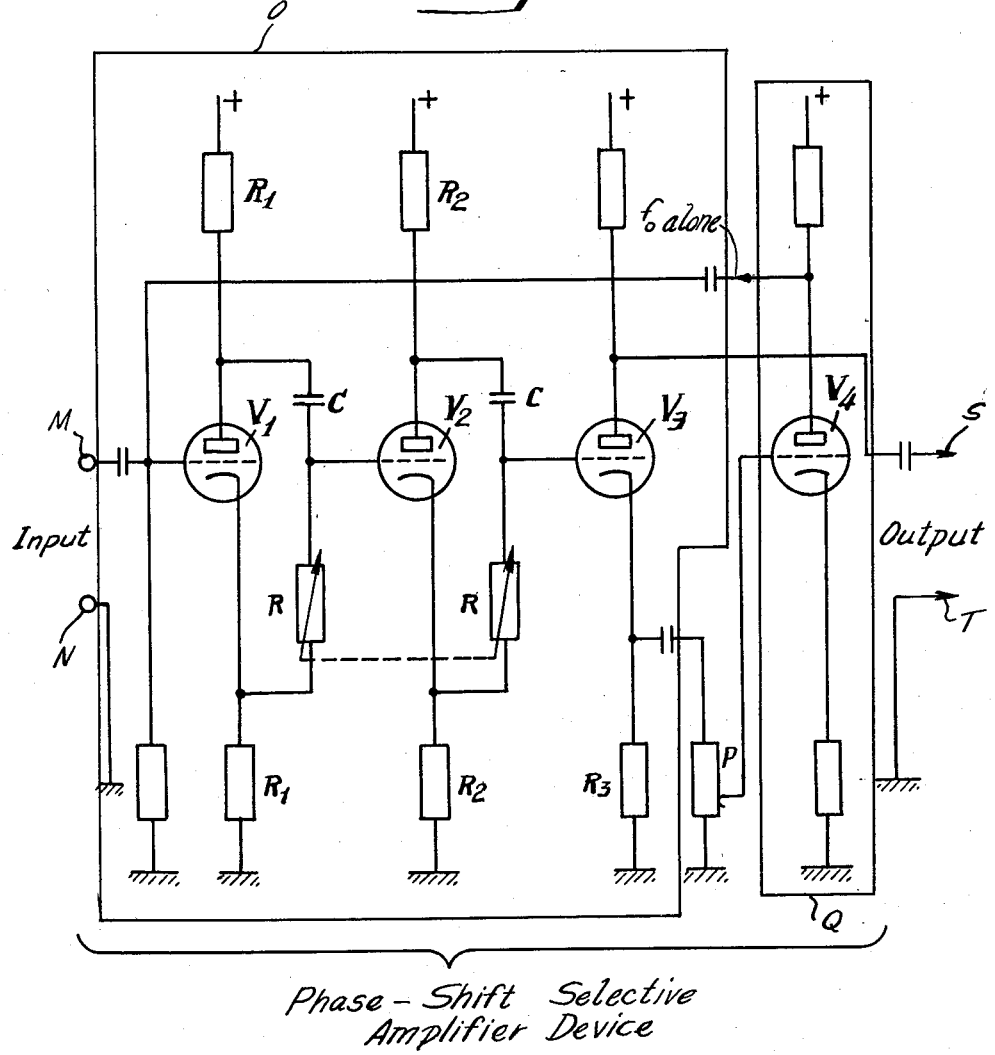
Figure 6:
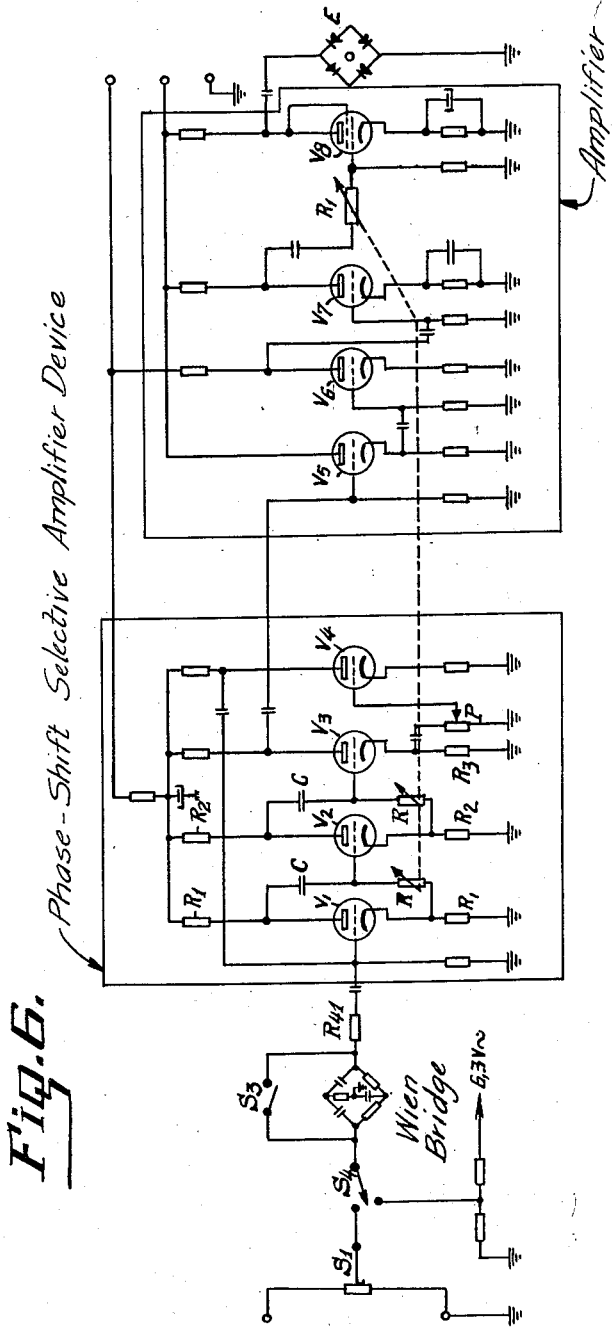

In the drawings:

Fig. 1 illustrates diagrammatically a phase-shift circuit;
Fig. 2 shows a vector diagram of the voltages of Fig. 1;
Fig. 3 illustrates a tube phase shifter variant of Fig. 1;
Fig. 4 is a block diagram of a selector stage;
Fig. 5 shows the details of a selector stage; and
Fig. 6 is a circuit diagram of a phase-shift type of frequency selector.

The diagram of the phase-shift circuit (Fig. 1) has the important property of maintaining the output voltage $e_0$ constant so that its phase can be modified (for a fixed input frequency) by variation of the resistance R. In the same way, if the resistance R remains fixed but the input frequency is varied, the phase of the output voltage varies though its amplitude remains invariable because the change of frequency has the same effect as if the value of the capacity C is modified.

Figure 2 represents the vector diagram of the voltages of Fig. 1. The phase of the voltages $e_{12}$ and $e_{23}$ is taken as reference. It is assumed that the output circuit to which the phase-shifter is coupled has a very high impedance so that the current absorbed by the output circuit can be neglected; the only current to be taken into consideration is that which flows in C and R. The current flowing in C is in advance of the applied voltage $e_{13}$. The potential drop across R and C will be equal to this voltage. On the other hand, it is known that the potential drop between the terminals of R makes a right angle with that between the terminals of C; consequently, the position of $e_0$ is on an arc of a circle from which it appears that the vector $e_0$ always has the same length although its phase-shift angle can be varied, in principle, from 0 to 180°.

It is more convenient to replace the transformer in Fig. 1 by the tube phase-shifter as shown in Fig. 3.

Although a single phase-shift stage can be constructed to produce a total phase-shift of 180°, it is in practice more convenient to divide the total phase-shift of 180° into two stages of 90° and this is why use is made of two phase-shift stages.

Now, that an amplifier (two stages) is available capable of phase-shifting a predetermined frequency by 180°, the choice of this frequency being simply obtained by the choice of the value of a pair of resistances, a selective amplifier can be constructed which passes only the chosen frequency according to the block diagram of Fig. 4.

The output of the phase-shift stages contains all the input frequencies, but one of these, $f_0$, is phase-shifted by 180° with respect to the others. $f_0$ is the frequency of which the amplitude must be measured and on which the phase-shift circuits are harmonized. The feedback amplifier returns all these voltages to the input at inverted phase. They hence cancel all except $f_0$ which, having previously been phase-shifted by 180°, is again in phase and is hence received in amplified form at the output.

Fig. 4 is hence the block diagram of a selector stage. It is seen that it comprises a band-pass filter of which the central frequency is adjustable by a single set of phase-shift resistances and of which the output voltage remains constant whatever the selected frequency, which is obviously very convenient.

A very important element is shown in Fig. 4; to wit: the potentiometer P serving to regulate the degree of feedback.

Assume that it is initially adjusted at the lower end of its range. In this case, the feedback is small. The frequency $f_0$ is slightly amplified and the other frequencies are slightly attenuated; consequently, the response curve of the assembly is nearly flat, the selectivity is poor.

By increasing P, the feedback becomes more intense, the frequency $f_0$ is raised more and more and the others diminished. The selectivity is increased, but at the same time the gain of the assembly increases.

By increasing P, there comes a time when the feedback which is positive for $f_0$ causes oscillation of the assembly at the frequency $f_0$.

It is seen that adjustment of P, below the threshold limit, allows the selectivity to be varied and at the same time the gain, but for a fixed position of P, the selectivity and the gain are theoretically independent of the frequency.

Another interesting property in the application envisaged; the width of the pass-band is maintained at the same percentage of the central frequency whatever the latter may be.

Stated otherwise, the unit shown in Fig. 4 comprises two input terminals M and N. Input signals received by these terminals are processed as follows: Element O selects a frequency component and shifts its phase by 180 degrees obtaining a resultant signal which is phase shifted by 180 degrees and fed back to the input by element Q; thus the selected component adds to the input signal after feedback while the remaining components cancel; only the selected component appears at output terminals S and T; potentiometer P controls the magnitude of the feedback signal and thus the selectivity of the device.

Fig. 5 shows the details of a selector stage as indicated by Fig. 4. In Fig. 5, elements corresponding to those of Fig. 4 are indicated by the same letters. There will be noted the phase-shifted tubes $V_1$ and $V_2$, the phase-shifter circuits R and C as well as the tube $V_4$ which constitutes the feedback amplifier determining the selectivity provided under the control of the potentiometer P. In the case of the invention, the resistances R are constituted by a set of 10 resistances corresponding to the frequencies 50, 100 . . . 500 cycles. The resonance frequency is clearly that for which the reactance of the condenser C is equal to the resistance R.

The tube $V_3$ which is called the output stage, is necessary for the feedback to have the desired phase and since the impedance at the input grid should be constant.

It is to be noted that the phase-shift stages $V_1$ and $V_2$ and the output stage $V_3$ are directly coupled in series so as to avoid any undesired variation of phase.

Without going into the details of the calculation of the elements of the circuit, it may be mentioned that the resistances $R_1$ as well as the resistances $R_2$ should be carefully matched so as to ensure equality of the vectors $e_{12}$ and $e_{23}$ (Figs. 1 and 2). Their values should be made relatively low; in fact, it is very important for the internal impedance of the phase-shift stages to be low so that the current taken by the phase-shift elements R and C does not exert any influence.

For the same reason, the values of R and of the reactance of C should be made sufficiently high.

It will be noted that, as the phase-shift stages are arranged in series by direct coupling, the resistances $R_2$ should have a value double that of the resistances $R_1$, and $R_3$ three times that of $R_1$.

It will also be seen that this arrangement presents only a small time constant which permits it to follow the rapid variations of amplitude of the harmonic selected.

In Fig. 6, there is shown the detailed circuit arrangement in which $V_1$, $V_2$, $V_3$, $V_4$ form a phase-shift type frequency selector. In this drawing, a single assembly has been shown, but in general two assemblies will be coupled in series.

According to the invention, their frequencies are arranged one to be above and the other to be below the central frequency by about 2%, so as to obtain a flat response in the pass-band with a good selectivity.

In order to avoid their not reacting one upon the other, the selectors are connected through the intermediary of a de-coupling resistance.

The apparatus comprises the following elements:

(1) Input attenuators symbolically shown at $S_1$ calibrated for the usual voltages and currents to be measured (220 v., 220√3 v., 110 v., 110√3 v., 10 v., 1 v.).

The output voltages are of the order of 0.1 v., this value being chosen to avoid saturation of the input stage.

The impedance chosen is high because the input of the selector stage is of high impedance. In order to maintain the impedance of the attenuators at the grid of the selector stage as constant as possible, a high value resistance ($R_{41}$) can be inserted between the attenuator output and the input grid of the first selector stage.

(2) A Wien bridge: A Wien bridge, working at 50 cycles, is inserted between the input attenuators and the input of the first selector.

This Wien bridge, when put into service for the recording of the harmonics, consequently permits, by the elimination of the fundamental component, the admission of a much higher input signal without saturating the input stage, than in the case where the fundamental is present; this has the advantage of saving a supplementary amplification stage of which the gain should be equal to 10 at the output of the apparatus.

It can be put out of operation by the switch $S_3$ mounted in shunt when the fundamental wave is being recorded.

(3) The desired number of assemblies of phase-shift selectors constituted by the tubes $V_1$ to $V_4$ arranged in series, the central frequencies of each of the phase-shift selector assemblies being arranged with respect to each other so as to achieve: (1) the pass-band desired; (2) a selectivity sufficient to separate two adjacent harmonics.

The choice of the frequency desired is made by the control of the resistance decades "R" of all the selector assemblies simultaneously, in selecting the fundamental or the chosen harmonic.

(4) An amplifier consisting of tubes $V_5$ to $V_8$ specially arranged to operate a pen recorder of the continuous paper-roll type.

This amplifier comprises a device $R_1$ for correction of the gain as a function of the chosen frequency compensating the response of the Wien bridge for the different harmonics.

$R_1$ is constituted by a set of resistances switched simultaneously with "R."

A switch $S_4$ permits either verification of the calibration of the apparatus or making a measurement.

The recorder is shown at E.

The apparatus forming the object of the invention affords an important enrichment in the art because among the various known wave analysers none is provided for operating a recorder; they are all indicators.

In principle, it is always possible to join to a given analyser an amplifier, specially constructed for this purpose, operating a recorder.

This solution has not hitherto been practicable because it is necessary to find an analyser having characteristics responding to the desiderata enumerated above.

Known analysers do not give satisfaction because:

(1) Some are—
(a) much too selective and in this case they are not independent of the normal frequency fluctuations of the networks. Even if they are capable of being connected to a special amplifier device permitting operation of a recorder, the registration will be affected by the error due to the normal frequency fluctuations of the networks.
(b) insufficiently selective; in this case they are indeed insensitive to the normal frequency fluctuations but they do not separate adjacent harmonics whereby there is an error in measuring them.
(c) or have a pass-band which has a fixed number of cycles; in this case, they do not respond to the requirement of being endowed with a pass-band of which the size remains equal to a given percentage of the harmonic frequency measured whatever its value.

(2) The others have characteristics such that they are inappropriate for use with network frequencies.

What I claim is:

1. A harmonic recording device comprising a phase-shift selective amplifier for receiving an input signal and selecting a frequency component thereof, a low frequency amplifier coupled to said selective amplifier for amplifying said component, and a recorder coupled to said low frequency amplifier for recording the amplifier component, said selective amplifier comprising circuit means for selecting the frequency component of the input signal and shifting the phase of the component by 180 degrees, and feedback means operatively associated with said circuit means for shifting the phase of the resultant signal including the shifted component by 180 degrees and combining the shifted resultant signal with the input signal to cancel effectively all but the selected component.

2. A device as claimed in claim 1 comprising a control coupled to said feedback means to control the magnitude of the shifted resultant signal and thereby the selectivity of said selective amplifier.

3. A device as claimed in claim 2 comprising a Wien bridge for feeding the input signal to the selective amplifier.

4. Apparatus for effecting continuous recording of the amplitude of harmonics present in an industrial power supply network, which comprises a frequency selective amplifier having an input for receiving a composite frequency input signal and selecting a frequency component thereof, said amplifier including frequency dependent phase-shift means and a feedback signal channel, said phase-shift means bringing only that frequency which is to be selected into predetermined relationship with the composite input signal and said feedback channel applying the phase-shifted and selected frequency to the amplifier input with a positive feedback relationship to the input signal, a low frequency amplifier having a linear response curve over the range of harmonic frequencies to be recorded connected to said frequency selective amplifier and an electric signal recorder arranged for operation by the output signals from said low frequency amplifier.

References Cited in the file of this patent
UNITED STATES PATENTS

| | | |
|---|---|---|
| 1,442,781 | Nichols | Jan. 16, 1923 |
| 1,989,677 | Bowles | Feb. 5, 1935 |
| 2,005,011 | Specht | June 18, 1935 |
| 2,785,377 | MacFee et al. | Mar. 12, 1957 |
| 2,794,954 | Bischoff | June 4, 1957 |